No. 639,547. Patented Dec. 19, 1899.
T. FERGUSON & G. B. BRACE.
GATE.
(Application filed Apr. 21, 1899.)
(No Model.)
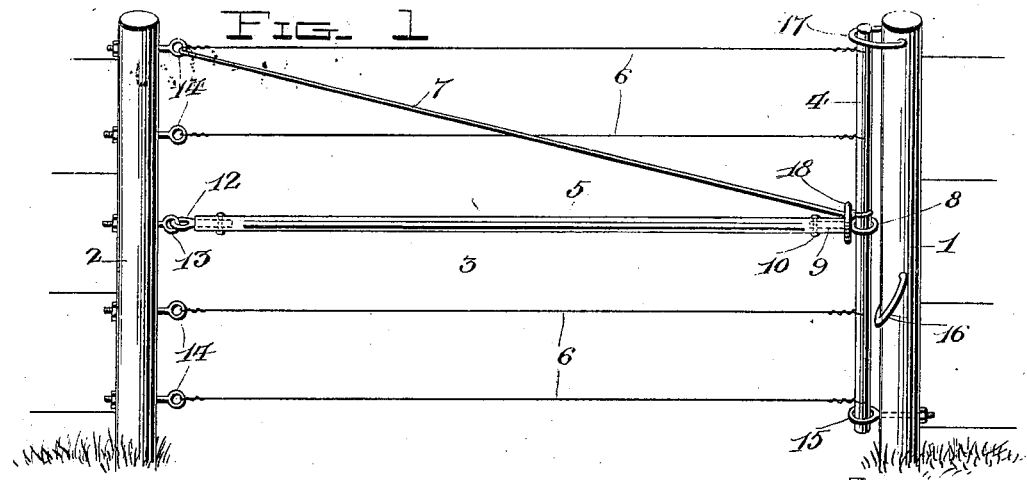
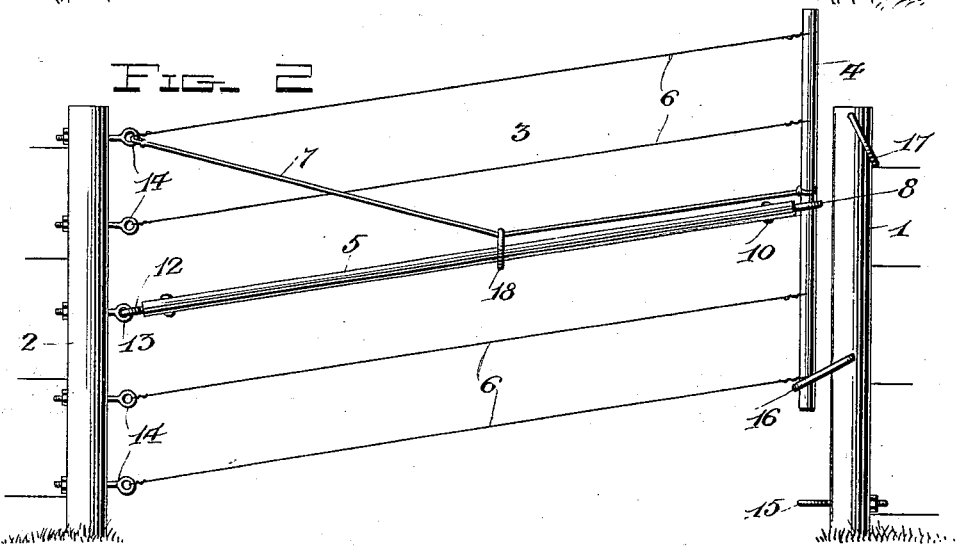
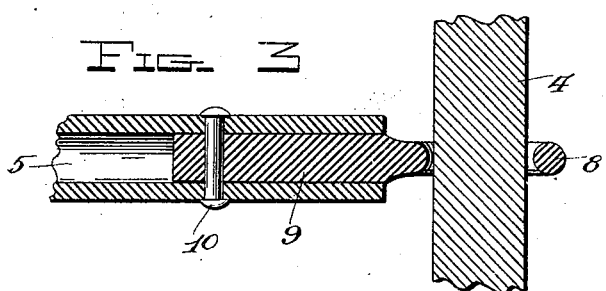
Witnesses
Inventors
T. Ferguson and
George Bannister Brace,
by
H. B. Willson & Co.
Attorneys

UNITED STATES PATENT OFFICE.

THOMAS FERGUSON AND GEORGE BANNISTER BRACE, OF PARKERSBURG, IOWA.

GATE.

SPECIFICATION forming part of Letters Patent No. 639,547, dated December 19, 1899.

Application filed April 21, 1899. Serial No. 713,831. (No model.)

*To all whom it may concern:*

Be it known that we, THOMAS FERGUSON and GEORGE BANNISTER BRACE, citizens of the United States, residing at Parkersburg, in the county of Butler and State of Iowa, have invented certain new and useful Improvements in Gates; and we do declare the following to be a full, clear, and exact description of the invention, such as will enable others skilled in the art to which it appertains to make and use the same.

The invention has relation to gates, and more particularly to that class known in the art as "wire gates."

The object of the invention is to provide a gate of this character which shall be simple in construction, durable in use, comparatively inexpensive of production, and one which in opening and closing may be elevated to swing over obstructions and which when closed may be tilted or adjusted vertically to permit fowls and small animals to pass under the same.

With this object in view our invention consists in certain features of construction and combination of parts, which will be hereinafter more fully described and claimed.

In the accompanying drawings, Figure 1 is a side elevation of a gate embodying our invention, the gate being shown closed. Fig. 2 is a similar view with the gate elevated or adjusted vertically. Fig. 3 is a sectional view through one end of the longitudinal tube and the gate, illustrating the manner of securing the eyebolt in position.

In the drawings, 1 and 2 denote the fence-posts.

3 denotes the gate, consisting of a vertical bar or upright 4, the longitudinal tube 5, the longitudinal wires 6, and the guy or truss 7. The longitudinal tube 5 is connected at one end to the bar or upright 4 by an eyebolt 8, the shank end 9 of which is inserted into the outer end of the tube 5 and held therein by a rivet or bolt 10. The inner end of the tube 5 is operated with an eyebolt 12, the same in construction and secured in place in the same manner as the eyebolt 8. This eyebolt 12 is connected to the fence-post 2 by an eyebolt or hook 13. The wires 6 at their outer ends are carried through the gate bar or upright 4, then wrapped around the bar or upright, and have their extremities twisted around the body portion of the wires. The inner ends of these wires are connected to the post 2 by the screw-eyes 14, so that any sag in the wires may be taken up by operating said screw-eyes. The guy or truss extends diagonally across the gate and has one end connected to the bar or upright 4 and the other end connected to the post 2. This guy or truss may be in the form of a wire or cable.

15 denotes an eyebolt secured to the post 1.

17 denotes a loop secured to the upper end of the post.

To fasten the gate in a closed position, the lower end of the bar or upright 4 is slipped into the eyebolt 15 and the loop 17 is thrown over the upper end of the bar or upright. To open the gate, the loop 17 is removed from engagement with the upper end of the bar or upright, the lower end of the bar or upright is removed from the eyebolt 15, and the gate may be swung open and be elevated to clear any obstructions. When it is desired to hold the gate in an elevated position to permit fowls and small animals to pass under the same, the lower end of the bar or upright is engaged with the loop 16, and the ring 18, which encompasses the guy 7 and the longitudinal tube 5, is slipped along said tube, so that the gate will be held in the position shown in Fig. 2, the loop holding it elevated, while the ring 18 by tightening the guy prevents the gate from sagging.

From the foregoing description, taken in connection with the accompanying drawings, the construction, operation, and advantages of the invention will be readily understood without requiring an extended explanation. It is exceedingly simple, may be made at small cost, and is well adapted for the purpose for which it is designed.

Having thus fully described our invention, what we claim, and desire to secure by Letters Patent, is—

The combination with the fence-post, of a gate consisting of a bar or upright, a longitudinal tube secured at one end to said gate bar or upright, fence-wires having their outer ends connected to said gate bar or upright, means for loosely connecting said fence-wires and longitudinal tube to one of the fence-posts, a guy or truss extending diagonally across the gate and having one end secured to the gate bar or upright and the other end connected with one of the fence-posts, a ring encompassing said longitudinal tube and the guy or truss, and an eyebolt and loop secured to one of the fence-posts, adapted to engage the gate bar or upright, substantially as set forth.

In testimony whereof we have hereunto set our hands in presence of two subscribing witnesses.

THOMAS FERGUSON.
GEORGE BANNISTER BRACE.

Witnesses:
J. R. STRICKLAND,
M. W. BRENNAN.